(12) United States Patent
Leonard

(10) Patent No.: US 10,663,673 B2
(45) Date of Patent: May 26, 2020

(54) FIBER OPTIC CONNECTORS HAVING DIAMOND-LIKE CARBON THIN FILM COATED OPTICAL FIBERS

(71) Applicant: Optical Cable Corporation, Roanoke, VA (US)

(72) Inventor: Teddy W. Leonard, Wirtz, VA (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 16/202,915

(22) Filed: Nov. 28, 2018

(65) Prior Publication Data

US 2019/0162912 A1 May 30, 2019

Related U.S. Application Data

(60) Provisional application No. 62/591,474, filed on Nov. 28, 2017.

(51) Int. Cl.
*G02B 6/36* (2006.01)
*G02B 6/38* (2006.01)

(52) U.S. Cl.
CPC ......... *G02B 6/3847* (2013.01); *G02B 6/3818* (2013.01); *G02B 6/3869* (2013.01); *G02B 6/3878* (2013.01)

(58) Field of Classification Search
CPC .. G02B 6/3885; G02B 6/3887; G02B 6/3821; G02B 6/3893; G02B 6/36
See application file for complete search history.

(56) References Cited

U.S. PATENT DOCUMENTS

| | | |
|---|---|---|
| 6,572,935 B1 | 6/2003 | He et al. |
| 9,383,525 B2 | 7/2016 | Leonard et al. |
| 2008/0107381 A1* | 5/2008 | Nishioka ............... G02B 6/3829 385/60 |
| 2009/0060427 A1 | 3/2009 | Wouters |
| 2016/0238800 A1* | 8/2016 | Larson .................. B24B 19/226 |

* cited by examiner

*Primary Examiner* — Jennifer Doan
(74) *Attorney, Agent, or Firm* — William G. Heedy; The Van Winkle Law Firm

(57) ABSTRACT

A fiber optic connector contains a housing on which either a male or a female ferrule is mounted. A cable entering from one end of the fiber optic connector is spliced into multiple optical fibers. The tips of the optical fibers are coated with diamond-like carbon (DLC) thin films which are transparent for signal transmission within a wavelength range from 820 nm to 1625 nm. Two fiber optic connectors can be connected by intermating the male and the female ferrules, in which the two corresponding optical fibers are aligned with or without physical contact.

14 Claims, 2 Drawing Sheets

FIBER OPTIC CONNECTORS HAVING DIAMOND-LIKE CARBON THIN FILM COATED OPTICAL FIBERS

RELATED APPLICATION

This application claims the benefit of U.S. Provisional Patent Application Ser. No. 62/591,474 filed on Nov. 28, 2017.

FIELD OF THE INVENTION

This invention relates to the field of fiber optic connectors, and, more particularly, to the field of protective coatings of optical fibers.

BACKGROUND OF THE INVENTION

Optical fiber connectors are widely used in the communication industry. These connectors typically have one or more optical fiber connections which are supported by ferrules which also physically align the connection. These optical fiber connections are often formed by polishing the tip of the optical fiber to a precise radius of curvature. A connector actually includes two connector halves which are intermatable. However, a connector half is often simply referred to as a connector. Thus, the single or multiple connections are actually received within a connector half. When a corresponding connector half containing optical fibers and contacts is mated with the other connector half, the optical fiber tips are brought together at their respective radii of curvature. If the intermated tips of the connection are clean and undamaged, the connection should have reasonably low insertion loss and small back reflection. In addition, it is important to correctly match these intermated optical connections; for example, the corresponding intermated connections must be correctly sized and aligned. Ideally, two optical fibers should be optically and physically identical and held by a connector that aligns the fibers precisely so that the interconnection does not exhibit any influence on the light propagation there through. This ideal situation is impractical because of many reasons, including fiber properties and tolerances in the connector. The tips of the fibers have been treated by several methods, including scoring and breaking the fibers, as well as polishing the tips. Optical fiber connections having very low back reflection become more important at higher data rates.

SUMMARY OF THE INVENTION

In accordance with one form of this invention, there is provided a fiber optic connector having diamond-like carbon (DLC) thin film coated optical fibers, the fiber optic connector includes a housing on which a connector half is mounted on a first end of the housing, a cable entering from a second end of the housing and being spliced into a plurality of optical fibers, each of the plurality of optical fibers having a tip, the tip of each of the plurality of optical fibers being coated with a DLC thin film, and wherein the plurality of the DLC thin film coated optical fibers is structured and disposed for signal transmission with physical contact when connecting with a corresponding connector.

In accordance with another form of this invention, there is provided a fiber optic connector having diamond-like carbon (DLC) thin film coated optical fibers, the fiber optic connector includes a housing on which a connector half is mounted on a first end of the housing, a cable entering from a second end of the housing and being spliced into a plurality of optical fibers, each of the plurality of optical fibers having a tip, the tip of each of the plurality of optical fibers being coated with a DLC thin film, and wherein the plurality of the DLC thin film coated optical fibers is structured and disposed for signal transmission without physical contact when connecting with a corresponding connector.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DESCRIPTION OF THE PREFERRED EMBODIMENTS

Figure 1:
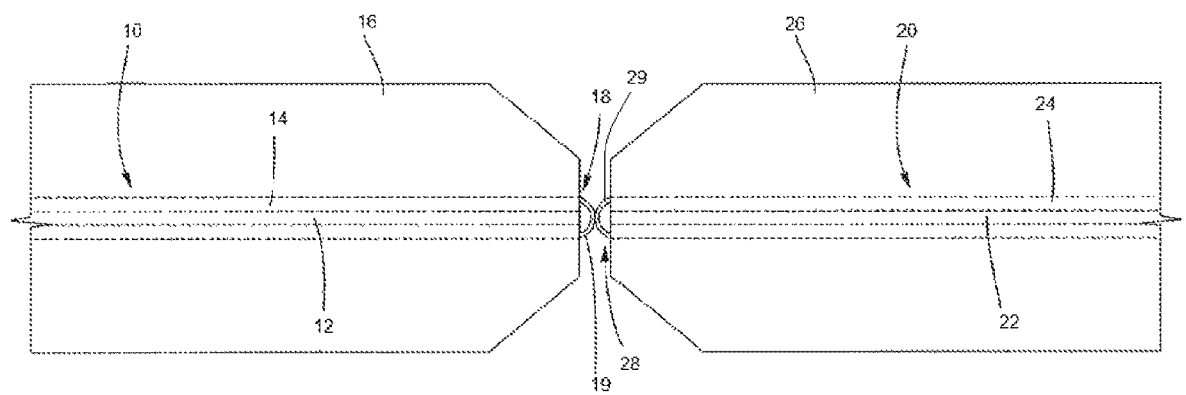
FIG. 1 is a simplified partial side elevational view showing two connecting optical fibers of the two optical fibers coated with diamond-like carbon (DLC) thin films on tips with physical contact.

Referring initially to FIG. 1, there is provided a first optical fiber 10 having a first core 12 and a first cladding 14. There is also provided a second optical fiber 20, having a second core 22 and a second cladding 24. Fiber 10 is encapsulated by a first ferrule 16 and fiber 20 is encapsulated by a second ferrule 26 for alignment. As will be discussed below, optical fibers 10 and 20 are mounted in corresponding connector halves which are designed to be intermated.

A first tip 18 of the first optical fiber 10 is coated with diamond-like carbon (DLC), forming a first DLC thin film 19. A second tip 28 of the second optical fiber 20 is also coated with DLC, forming a second DLC thin film 29. The DLC thin films 19 and 29 are optically transparent and scratch-resistant, connecting with physical contact for signal transmission. The DLC thin films can be deposited on the optical fiber tips by plasma-based method, glow-discharge techniques, ion beam deposition, etc. The DLC thin films 19 and 29 have a Knopp hardness which is greater than the Knopp hardness of optical fibers.

The DLC thin films 19 and 29 may be angle polished or have its coating thickness adjusted for low reflection and thermally shaped for additional reflection reduction. The surface of the DLC thin film 19 or 29 may be pre-shaped if necessary to compensate for possible changes in the optical fiber tip shape during formation of the DLC thin film, and to compensate for any non-uniformities of the DLC thin film, such as thickness variation. This pre-shaping compensation will allow the desired tip shape to be obtained after coating of the DLC thin film 19 or 29. The DLC thin film 19 or 29 is deposited on the tip of the optical fiber 10 or 20, forming a coating with a thickness that is thin enough so that light passing through is substantially unaffected, i.e., insertion losses are low but thick enough to resist scoring, and the thickness of the thin film may optionally be adjusted so that reflection is low.

Figure 2:
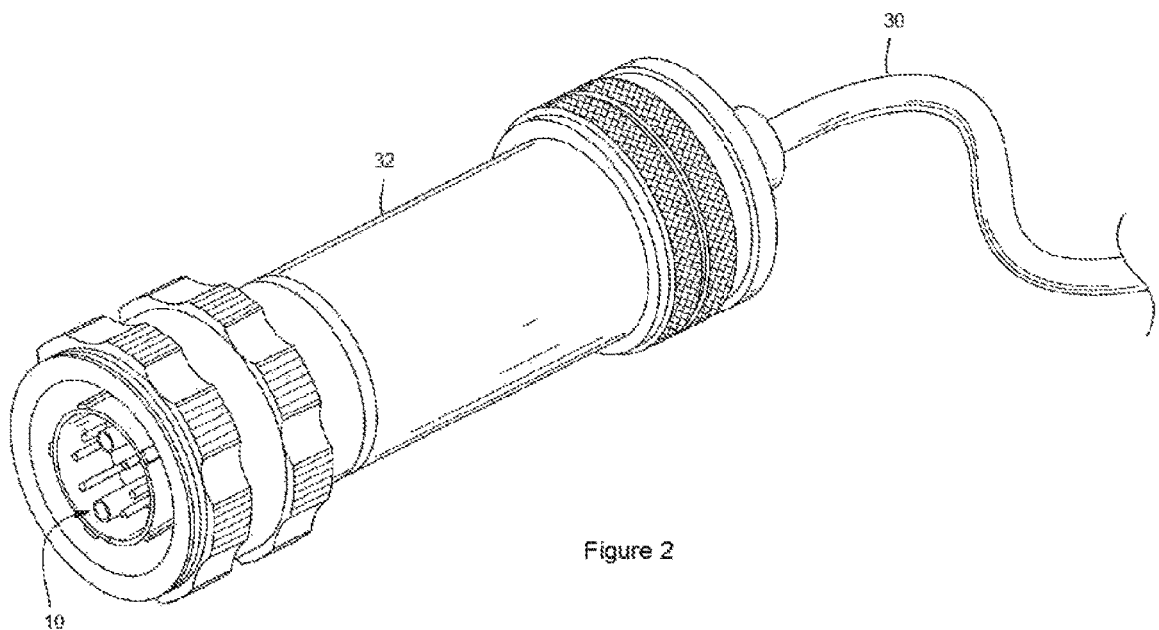
FIG. 2 is a perspective view showing a fiber optic connector half within which there is a plurality of DLC-coated optical fibers.
Figure 3:
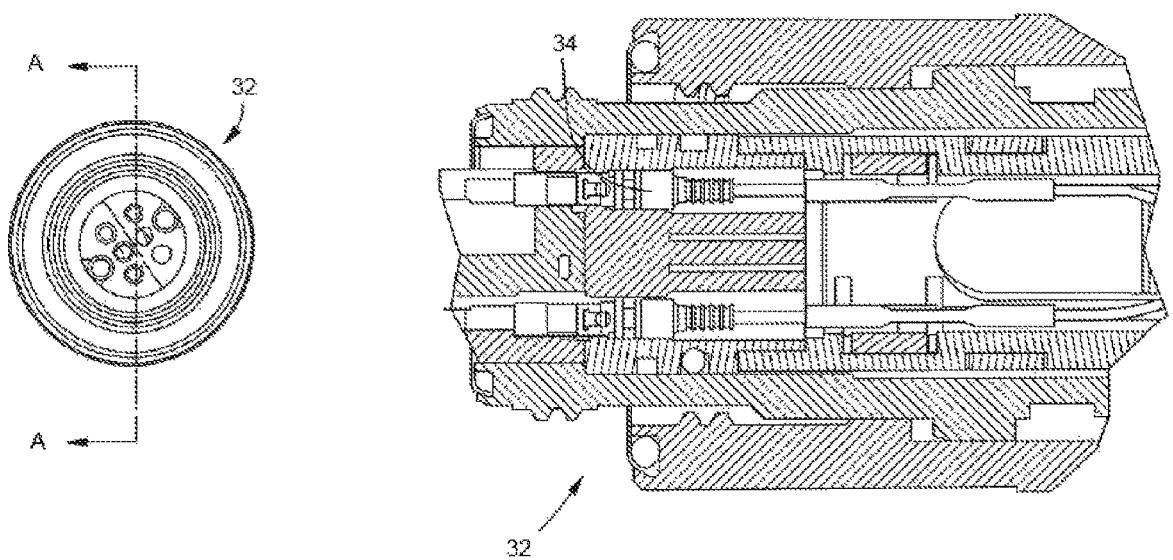
FIG. 3 is a sectional view of the fiber optic connector half of section A-A containing two quick terminating fiber optic assemblies with exposed optical fibers.

Referring now to FIG. 2, a plurality of DLC-coated optical fibers are shown contained within a connector body 32. Multi-fiber cable 30 extends from the rear of the connector body 32. FIG. 3 illustrates a sectional view of the fiber optic connector half of section A-A along the connector body 32 containing two quick terminating fiber optic assemblies with exposed optical fibers. Inside the connector body 32, the optical fiber contained in a fiber optic termini assembly 34 utilizing a quick connect device 36 (shown in FIG. 4) which are known to those skilled in the art such as the quick connect devices described in U.S. Patent Publication No. US2009/0060427 invented by Wouters. The teachings of the Wouters Patent Publication are hereby incorporated herein by reference.

Figure 4:
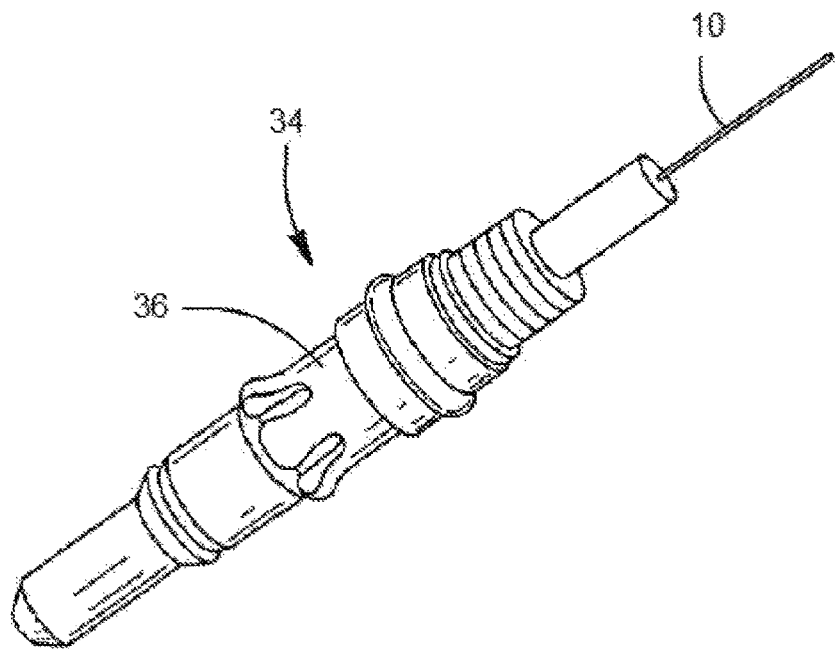
FIG. 4 is a perspective view showing a fiber optic termini assembly utilizing a quick connect device.

FIG. 4 illustrates the fiber optic termini assembly 34 utilizing a quick connect device 36. The DLC-coated optical fiber 10 is inserted into the fiber optic termini assembly 34 which is placed and aligned inside the connector body 28. The optical fiber 10 is one of the spliced fibers within the cable 30 formed by a splicing technique known to those skilled in the art.

The DLC thin film can be applied onto several layers of anti-reflective coating to form a thicker hardened anti-reflective coating, which may in some instances eliminate the need for thermally shaping the contact. In some multi-layer embodiments, the outer layer may be a hard, optically smooth DLC thin film, and the inner layers may be made of other low or high index of refraction materials having hardness closer to glass fiber. This anti-reflective coating can be used for one or multiple wavelength bands of operation, including, but not limited to, the bands centered around 850 nm and 1,300 nm or 1,310 nm and 1,550 nm for example. The thickness of the anti-reflective coating depends on the number of layers of the film which are used. For example, the thickness might vary between 0.10 and 2.00 times the operating wavelength.

Multi-fiber circular connectors, such as the one shown in FIG. 2, are often used in harsh environments. Since such connectors must be keyed if the DLC-thin films are angle-polished, the orientation of the connection is hard to maintain. The combination of a hardened surface, scratch resistant thin film and low back reflection without the need for keyed contact orientation is a great benefit for harsh environment multi-fiber circular connectors. The DLC-coated optical fiber tips described herein may be angle polished or polished axially symmetric before or, in some embodiments, after application of the DLC thin film. The DLC-coated fiber tips are rugged and have low back reflection and may be used with single or multi-fiber connectors, including circular connectors and Multi-fiber Push On (MPO style) connectors with multi-fiber arrays. In one embodiment, the DLC thin film is transparent to light at the wavelength of operation of fiber optic systems (generally 820 nm to 1625 nm). In another embodiment, the DLC thin film may be coated on non-physical contact fiber optic connectors such as expanded beam lensed connectors.

From the foregoing description of various embodiments of the invention, it will be apparent that many modifications may be made therein. It is understood that these embodiments of the invention are exemplifications of the invention only and that the invention is not limited thereto.

What is claimed is:

1. A fiber optic connector having diamond-like carbon (DLC) thin film coated optical fibers, the fiber optic connector comprising:
   a housing on which a connector half is mounted on a first end of the housing;
   a cable entering from a second end of the housing and the cable being spliced into a plurality of optical fibers, each of the plurality of optical fibers having a tip;
   the tip of each of the plurality of optical fibers being coated with a DLC thin film; and
   wherein the plurality of the DLC thin film coated optical fibers is structured and disposed for signal transmission with physical contact when connecting with a corresponding connector.

2. The fiber optic connector as recited in claim 1, wherein the connector half is a male ferrule.

3. The fiber optic connector as recited in claim 1, wherein the fiber optic connector half is a female ferrule.

4. The fiber optic connector as recited in claim 1, wherein the DLC thin film is optically transparent to light.

5. The fiber optic connector as recited in claim 1, wherein the DLC thin film coated optical fibers are structured and disposed for signal transmission within wavelength range from 820 nm to 1625 nm.

6. A fiber optic connector having diamond-like carbon (DLC) thin film coated optical fibers, the fiber optic connector comprising:
   a housing on which a connector half is mounted on a first end of the housing;
   a cable entering from a second end of the housing and the cable being spliced into a plurality of optical fibers, each of the plurality of optical fibers having a tip;
   the tip of each of the plurality of optical fibers being coated with a DLC thin film; and
   wherein the plurality of the DLC thin film coated optical fibers is structured and disposed for signal transmission without physical contact when connecting with a corresponding connector.

7. The fiber optic connector as recited in claim 6, wherein the connector half is a male ferrule.

8. The fiber optic connector as recited in claim 6, wherein the fiber optic connector half is a female ferrule.

9. The fiber optic connector as recited in claim 6, wherein the DLC thin film is optically transparent to light.

10. The fiber optic connector as recited in claim 6, wherein the DLC thin film coated optical fibers are structured and disposed for signal transmission within wavelength range from 820 nm to 1625 nm.

11. The fiber optic connector as recited in claim 1, wherein the DLC thin film has a Knopp hardness which is greater than a Knopp hardness of the optical fibers.

12. The fiber optic connector as recited in claim 1, wherein the DLC thin film is angle polished.

13. The fiber optic connector as recited in claim 1, wherein the DLC thin film has a coating thickness and the coating thickness is adjusted for low reflection.

14. The fiber optic connector as recited in claim 1, wherein the DLC thin film has a surface which has been pre-shaped to compensate for changes in the optical fiber tip shape during formation of the DLC thin film.

* * * * *